US009772911B2

(12) United States Patent
Barber et al.

(10) Patent No.: US 9,772,911 B2
(45) Date of Patent: Sep. 26, 2017

(54) POOLING WORK ACROSS MULTIPLE TRANSACTIONS FOR REDUCING CONTENTION IN OPERATIONAL ANALYTICS SYSTEMS

(71) Applicant: International Business Machines Corporation, Armonk, NY (US)

(72) Inventors: Ronald J. Barber, San Jose, CA (US); Bishwaranjan Bhattacharjee, Yorktown Heights, NY (US); Mohammad Sadoghi Hamedani, Chappaqua, NY (US); Guy M. Lohman, San Jose, CA (US); Chandrasekaran Mohan, San Jose, CA (US); Ippokratis Pandis, Palo Alto, CA (US); Vijayshankar Raman, Sunnyvale, CA (US); Richard S. Sidle, Mountain View, CA (US); Adam J. Storm, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 14/671,639

(22) Filed: Mar. 27, 2015

(65) Prior Publication Data
US 2016/0283331 A1    Sep. 29, 2016

(51) Int. Cl.
*G06F 11/14*    (2006.01)
*G06F 9/46*    (2006.01)
*G06F 17/30*    (2006.01)

(52) U.S. Cl.
CPC .......... *G06F 11/1474* (2013.01); *G06F 9/466* (2013.01); *G06F 11/1446* (2013.01);
(Continued)

(58) Field of Classification Search
CPC ............ G06F 11/1474; G06F 11/0709; G06F 11/0745; G06F 11/1402; G06F 11/1446;
(Continued)

(56) References Cited

U.S. PATENT DOCUMENTS 7,895,474 B2 *    2/2011    Collins ............... G06F 11/1471
                                                       714/15
8,032,885 B2    10/2011    Fish
(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Joseph D Manoskey
(74) *Attorney, Agent, or Firm* — Sherman IP LLP; Kenneth L. Sherman; Steven Laut (57) ABSTRACT

A method includes scanning multiple incoming database transaction requests. Each transaction includes one or more operations. Operations are clustered into a set of combined operations based on type of operation constraints. Log records are prepared and written for re-performing operations upon system failures, and for undoing operations upon an operation or a transaction failing to be processed fully. Each set of combined operations are performed within a thread. Each update operation is marked for a transaction within which the update operation belongs. Recoverable update operations belonging to a plurality of transactions are performed within a single logical thread of execution.

20 Claims, 8 Drawing Sheets

(52) U.S. Cl.
CPC .... *G06F 11/1471* (2013.01); *G06F 17/30362* (2013.01); *G06F 17/30377* (2013.01); *G06F 17/30563* (2013.01); *G06F 2201/80* (2013.01); *G06F 2201/87* (2013.01)

(58) Field of Classification Search
CPC ........... G06F 11/1471; G06F 17/30563; G06F 17/30362; G06F 17/30377; G06F 9/466; G06F 2201/80; G06F 2201/87
USPC .................. 714/16, 15, 19, 20, 27, 40, 47.1
See application file for complete search history.

(56) References Cited

U.S. PATENT DOCUMENTS

| | | | |
|---|---|---|---|
| 8,473,953 | B2 | 6/2013 | Bourbonnais et al. |
| 2002/0099862 | A1* | 7/2002 | Mikalsen ................ G06F 9/466 719/310 |
| 2007/0083530 | A1* | 4/2007 | Lakshminath .......... G06F 9/466 |
| 2013/0097136 | A1* | 4/2013 | Goldberg .......... G06F 17/30289 707/704 |
| 2015/0347551 | A1* | 12/2015 | Shang ............... G06F 17/30578 707/615 |

OTHER PUBLICATIONS

Pandis, I. et al., "PLP: Bage Latch-free Shared-everything OLTP", Proceedings of the 37th International Conference on Very Large Data Bases (VLDB Endowment), Aug. 29, 2011-Sep. 3, 2011, pp. 610-621, vol. 4, No. 10, United States.

IBM, "Asynchronous index cleanup", Oct. 1, 2008 (last updated), pp. 1-2, downloaded from http://www-01.ibm.com/support/knowledgecenter/SSEPGG_9.1.0/com.ibm.db2.udb.admin.doc/doc/c0021597.htm on Mar. 27, 2015, IBM Knowledge Center, United States.

Pandis, I., "Scalable Transaction Processing through Data-oriented Execution", May 2011, pp. 1-227, Carnegie Mellon University, Pittsburgh, United States.

Mohan, C., "ARIES: A Transaction Recovery Method. Supporting Fine-Granularity Locking and Partial Rollbacks Using. Write-Ahead Logging", ACM Transactions on Database Systems, Mar. 1992, pp. 94-162, vol. 17, No. 1, ACM, United Staes.

\* cited by examiner

POOLING WORK ACROSS MULTIPLE TRANSACTIONS FOR REDUCING CONTENTION IN OPERATIONAL ANALYTICS SYSTEMS

BACKGROUND

Embodiments of the invention relate to amortization of latching and logging costs for transactions in operational analytics systems, in particular, for pooling work across multiple transactions as a batch based on clustering request types.

There is an increasing trend towards doing business intelligence (BI) queries on real-time data in databases or tabled data. One important challenge in realizing business intelligence queries is contention between queries and large numbers of updates. Traditionally, every transaction (update or query) runs in its own thread, and takes latches and locks as appropriate to protect data accessed from concurrent modifications. This means BI queries have to deal with contention from many small transactions and point queries. At high throughputs, the physical contention overheads are severe, especially on multicore and non-uniform memory access (NUMA) hardware.

BRIEF SUMMARY

Embodiments of the invention relate to pooling work across multiple transactions as a batch based on clustering request types. One embodiment includes a method that includes scanning multiple incoming database transaction requests. Each transaction includes one or more operations. Operations are clustered into a set of combined operations based on type of operation. Log records are prepared and written for re-performing or undoing operations upon system failures, and for undoing operations upon an operation or transaction failing to be processed fully. Each set of combined operations are performed within a thread. Each update operation is marked for a transaction within which the update operation belongs. Recoverable update operations belonging to a plurality of transactions are performed within a single logical thread of execution.

These and other features, aspects and advantages of the present invention will become understood with reference to the following description, appended claims and accompanying figures.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
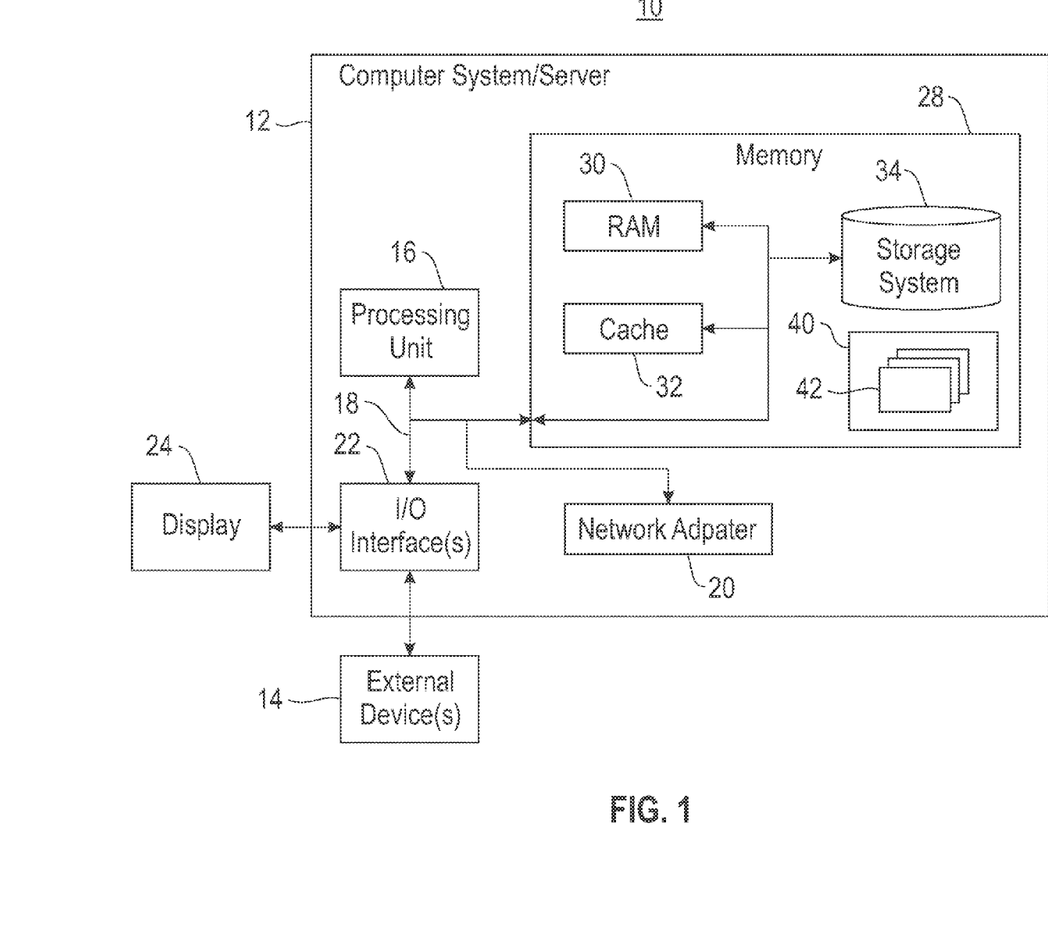
FIG. 1 depicts a cloud computing node, according to an embodiment.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include a(n) Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile/non-volatile media, and removable/non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in a memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via a network adapter 20. As depicted, the network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

Figure 2:
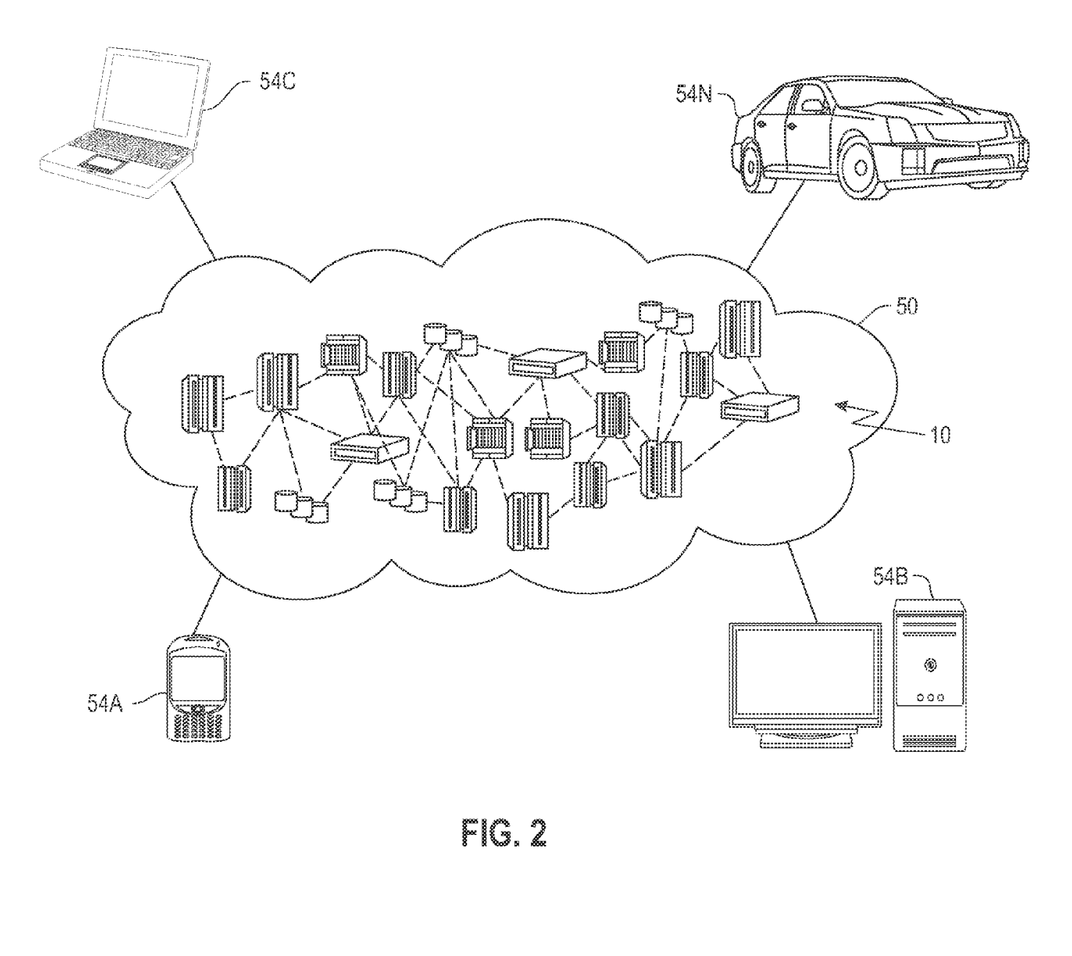
FIG. 2 depicts a cloud computing environment, according to an embodiment.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
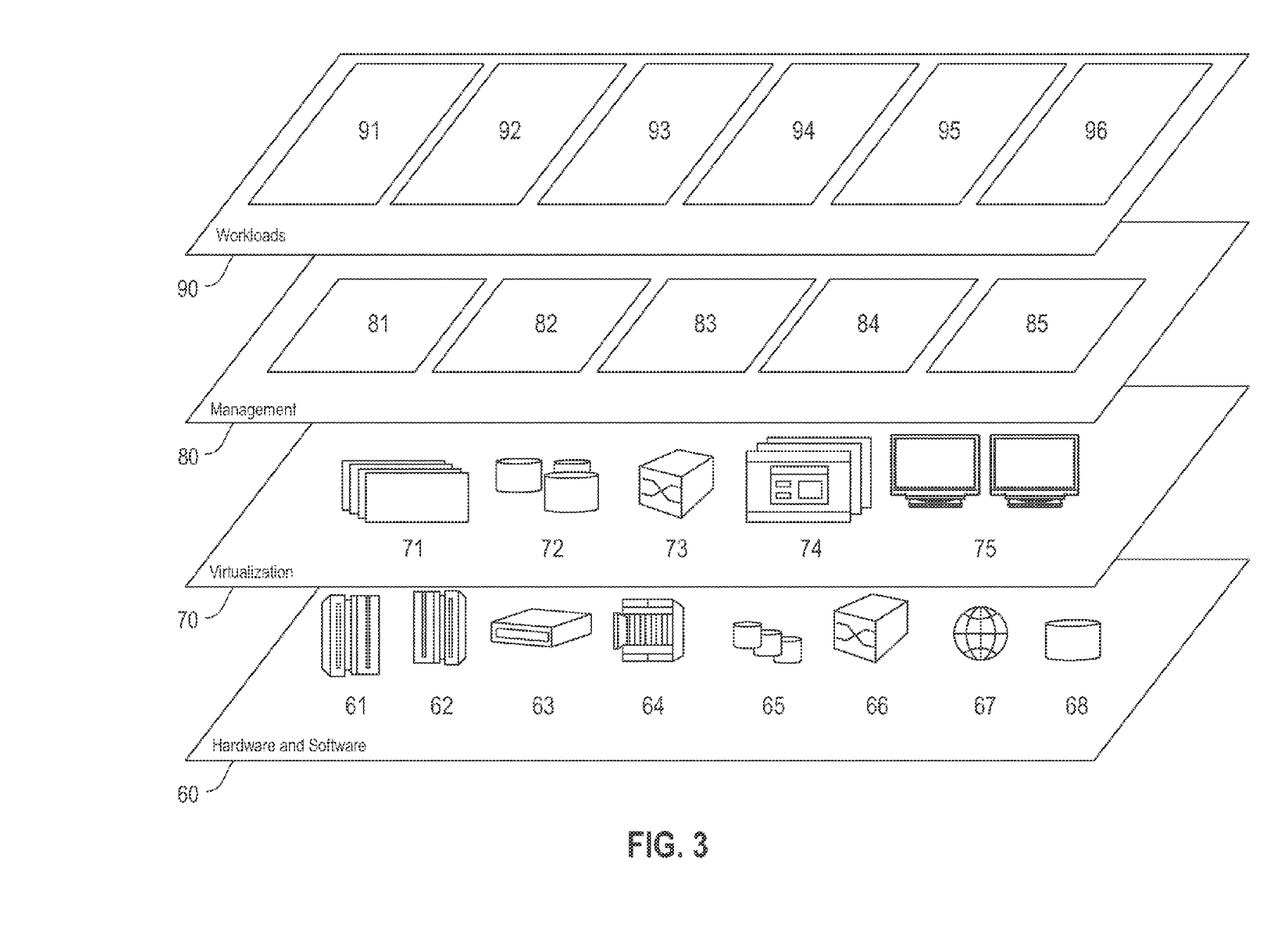
FIG. 3 depicts a set of abstraction model layers, according to an embodiment.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and batch processing 96. As mentioned above, all of the foregoing examples described with respect to FIG. 3 are illustrative only, and the invention is not limited to these examples.

It is understood all functions of one or more embodiments as described herein are typically performed by the system 400 (FIG. 4), which can be tangibly embodied as modules of program code 42 of program/utility 40 (FIG. 1). However, this need not be the case. Rather, the functionality recited herein could be carried out/implemented and/or enabled by any of the layers 60, 70, 80 and 90 shown in FIG. 3.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Embodiments of the invention relate to pooling work across multiple transactions as a batch based on clustering request types. One embodiment includes a method that includes scanning multiple incoming database transaction requests. Each transaction includes one or more operations. Operations are clustered into a set of combined operations based on type of operation constraints. Log records are prepared and written for re-performing operations upon operation failures. Each set of combined operations are performed within a thread. Each update operation is marked with the transaction within which the update operation belongs. Recoverable update operations in the same combined set, belonging to a plurality of transactions, are performed within a single logical thread of execution. In one embodiment, transactions that occur at about the same time and have a similar structure (i.e., affect the same database table and have similar predicates) are batched together for processing in a thread. In one embodiment, execution of highly similar SQL statements are combined in a batch, reducing per-statement overheads. In one embodiment, logs are retained for performing rollback or rollforward. In one embodiment, other consequences of updates are combined for batch processing, such as inserting data from the batched statements to the same pages of the database store, combining the updating of indexes and writing of log records and log sequence numbers (LSNs).

Figure 4:
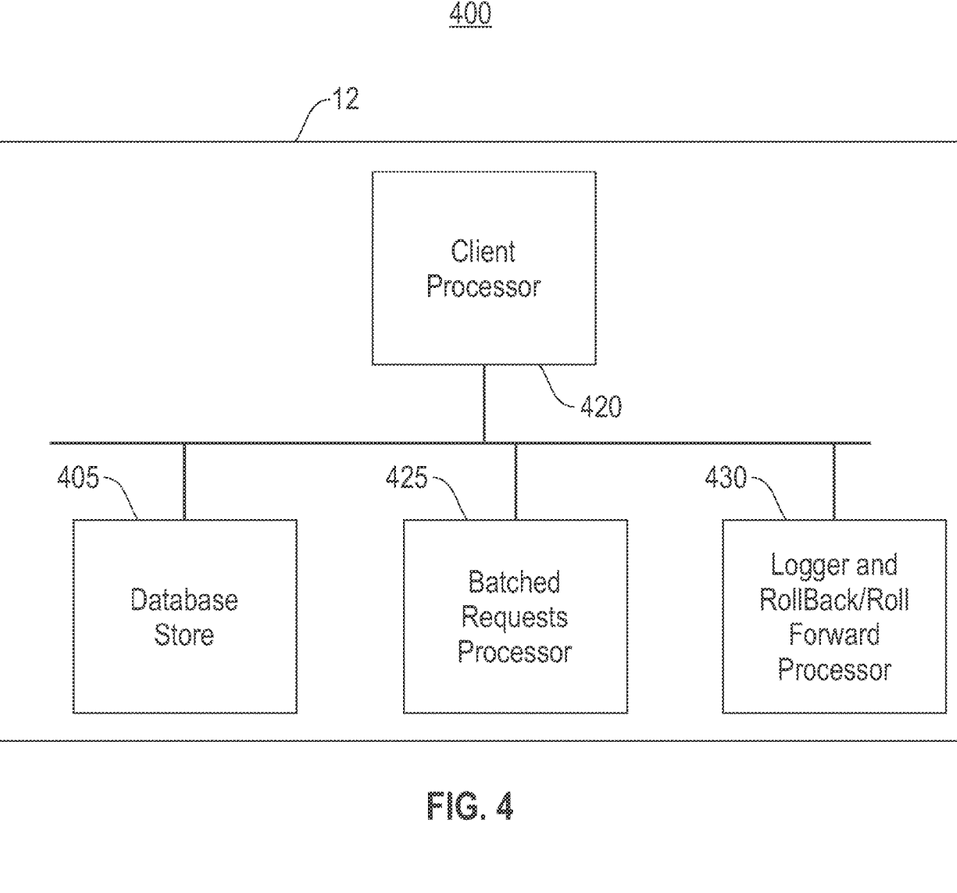
FIG. 4 is a block diagram illustrating a system for pooling work for multiple transactions, according to an embodiment.

FIG. 4 is a block diagram illustrating a system 400 for pooling work for multiple transactions, according to an embodiment. In one embodiment, the system 400 includes a server 12 including a database store 405, a client processor 420, a batched requests processor 425 and logger and a roll-back/roll-forward processor 430. In one embodiment, the database store 405 may be external to the server 12. In one embodiment, the database store 405 stores one or more databases.

In one embodiment, the client processor 420 scans multiple incoming requests for a database. A request is typically a statement of a (database) transaction. Each transaction can issue one statement at a time, or in a stored procedure model, the system 400 may look ahead multiple statements. One or more database operations (e.g., updates (inserts/deletes) or queries (data retrieval)) are typically grouped into a transaction. An update query is used to modify the existing records in a table. Transactions on a database may occur in parallel and do not necessarily commit in the order they are initiated. These events may be recorded in a database transaction log, an event log, etc. In most SQL databases, prepared statements can be used to increase the efficiency of applying updates/changes to a database. A prepared statement has both standard SQL syntax and placeholders (parameters) for the actual data values that will be supplied each time the statement is executed. A prepared statement only needs to be parsed by the database one time (overhead is incurred each time parsing occurs); each time that statement needs to be executed again with different values, the already parsed statement is submitted with different parameter values. In one embodiment, the client processor 420 may identify statements that are of a similar type (e.g., updates, queries, different instances of the same prepared statement). In one embodiment, the client processor 420 scans the request queue and determines the type of statements that are in the different requests.

In one embodiment, the client processor 420 clusters or combines operations into a set of combined operations based on type of operation constraints, and the batched requests processor 425 prepares and writes log records for re-performing operations upon operation failures by logger and the roll-back/roll-forward processor 430. In one embodiment, the client processor 420 analyzes the statements in the queue of pending transactions at the server 12, and assigns, to a request queue, statements of the same type, which will be executed in batch by the batched requests processor 425, which performs each set of combined operations within a thread. In one embodiment, a common paradigm is to execute modification operations (e.g., updates/deletes) conditionally, after verifying predicates (e.g., execute a trade if a stock price falls within a range).

In some transactions, the statements to be pooled are within a conditional branch. In one embodiment, conditional inserts are speculatively executed before the conditions are verified as long as the update values are known up front, and it is sufficient to roll-back if the subsequent condition verification fails. In one embodiment, the client processor 420 clusters requests by type as follows. In one embodiment, all inserts (i.e., inserting of new rows of data) into the same table are clustered together. In one embodiment, all point queries against a same column with a same type of predicate (equality, range, etc.) are clustered together. Note that the queries may have other (not homogenous) predicates as well; the work is pooled for some of the predicates within the queries.

In one embodiment, if any of the database operations fail, the operations are all rolled back by logger and the roll-back/roll-forward processor 430 and no trace of the transaction remains in the database. A roll-back statement is used to back out of the database changes that were made within a unit of work or a save point. In one embodiment, a roll-forward database command executed by the logger and roll-back/roll-forward processor 430 recovers a database by applying transactions recorded in the database log files. A roll-forward command can be run after a database or a table space backup image has been restored, or if any table spaces have been taken offline by the database due to a media error. In one embodiment, the logger and roll-back/roll-forward processor 430 performs recoverable update operations belonging to multiple transactions within a logical thread of execution.

In one embodiment, the client processor 420 marks each update operation for a transaction within which the update operation belongs. In one embodiment, the marking may include adding a transaction identification (ID), a timestamp, etc.

In one embodiment, for error handling for an insert command, constraint violations are flagged separately for each inserted row. In one embodiment, for point queries the following applies: suppose that many queries involve a predicate col=value. In one embodiment, these predicates are pooled into a "col in list" predicate, and a lookup on that list (e.g., after sorting) against the index is performed. Different transactions may need to see different states of the database. In one embodiment, this is enforced via additional system-generated predicates on timestamps or log high-water marks in multi-version concurrency control systems. A high-water mark is the set of blocks that have at one point contained data. For example, 1000 blocks may be allocated to a table but only 500 blocks are under the high-water mark. The blocks under the high-water mark are the blocks that will be read when the table is fully scanned. Multi-version concurrency control systems provide concurrent access to the database and in programming languages to implement transactional memory.

In one embodiment, work loads are gathered from different transactions. Clients send transaction statements to handler threads: a handler is different from an initial connection (for pooling multiple clients into one handler), and transaction statements buffer in the handler's socket. In one embodiment, a handler performs light parsing of transaction statements and distributes to the processing threads. In one example, operations may include combinations, such as:

Insert into table1
Insert→(indexInsert)*→(constraint check)*
Insert into table2
. . .
Point Query template 1
Point Query template 2
. . .

Similar examples for deletions/updates may be combined. In one embodiment, threads for ad hoc or very complex statements (non pooled) are also distributed to processing threads.

In one embodiment, the input may include: one or more threads, inserting into same InsRange (insertion range or range of tuples in the address space of the table). Each input has an array of transaction ID, statement ID (XID, StmtID), and an array of values to insert. In one embodiment, for latched inserts, the system 400 latches an insertRange. In one example, the needed number of tuple sequence numbers (TSNs) are reserved, pages are allocated as needed, bytes-used for varchars are incremented. To make sure that concurrent queries do not see the uncommitted inserts also known as "restricting visibility" in the art), values are initialized for a specific field, referred to as "tupleState," and other columns hold arbitrary values (at this point). In one embodiment, the number of active inserters (numActiveInserters) are incremented and a redo-only log is written for the inserts (if roll-back, space reclaimed only at grooming). In one example, a redo-undo log is written for start and tupleState fields, and a value for the page LSN is picked up. One example may be represented as the following (note that this example does not cover logging, or picking/setting the page LSN):

Latch insert Range

Allocate pages. Make sure that page with tupleState is initialized

Write log record for the inserts and pick up value for the page LSN

Do the inserts

Transpose inputs onto data pages and set page LSN

Set start←XID, tupleState←Inserted.

In another embodiment, for non-latched inserts, the system 400 allows multiple threads against the same insert range. In one embodiment, a row-wise redo-log record is written for the values, the values are copied, and the page LSN is set. In one embodiment, the page cleaner is disabled via numActiveInserts. In another embodiment, the system 400 sets the page LSN to the LSN of the batch-start. In one embodiment, the system 400 sets the page LSN to the LSN of the batch-start, and revisits a page to set the page LSN. In yet another embodiment, the system 400 may set page the LSN to the LSN of redo-LR, but at recovery, reapplies if the LSN of batch completion>pageLSN. In one example, the redo-undo log is written for setting start←XID, TS←inserted. In another example, the system 400 sets start←XID, TS←Inserted.

Figure 5:
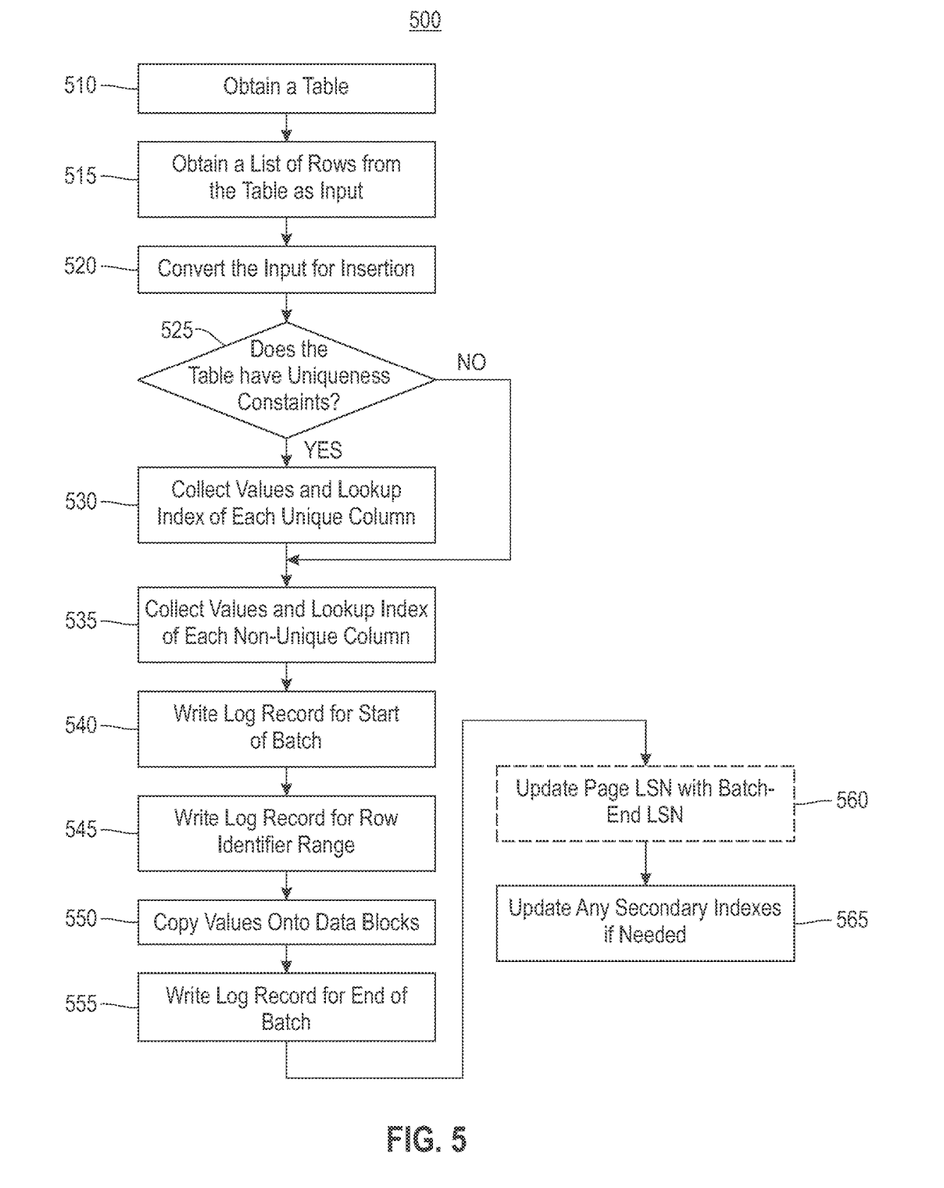
FIG. 5 illustrates a process for database insertions, according to an embodiment.

FIG. 5 illustrates a process 500 for database insertions, according to an embodiment. In one embodiment, a client processor scans incoming insert requests into a table of a database obtained in block 510. In one embodiment, in block 515 a list of rows from the table is obtained as the input for the insertion, by combining one or more insert requests, which can be from different transactions. Each input row is associated with a transaction and possibly a statement identifier. In one embodiment, in block 520 the input is converted for the insertion. In one example embodiment, in BI systems, tables are often stored as column-major. In one embodiment, a bulk transpose of the input rows is performed. In one embodiment, in block 525 it is determined whether the obtained table has uniqueness constraints. In one embodiment, if it is determined that the table has uniqueness constraints enforced using indexes (e.g., B-Trees), in block 530 the process 500 collects all the values to be inserted, for each unique column. A lookup into the index to enforce the uniqueness constraint is performed on each unique column, and with the collected values for B+ Tree indexes, it is useful to sort the values beforehand. Unique indexes can be defined on multiple columns i.e., a group of columns is unique when taken together. In that case, values are collected from all those columns and those are used to perform the lookup. In one or more embodiments, the process 500 amortizes the cost (e.g., processing cost, time to process, memory cost, bandwidth cost, etc.) of the index lookup by performing multiple lookups at the same time.

In one embodiment, in block 535 for columns on which there are check constraints, the process 500 collects the inserted values together and checks the constraints in bulk. For the insert rows that satisfy the above constraint checking, a range of row-identifiers into which they will be inserted are reserved. In one example embodiment, the row-identifiers are reserved using an atomic increment on a high-water mark value.

In one embodiment, in block 540 a log record for the start of the batch is written. A log (or audit trail) is a history of actions executed by a database management system to maintain ACID (atomicity, consistency, isolation, and durability) properties over crashes or hardware failures. Physically, a log is a file of updates done to the database, stored in stable storage. In one example, a database log record is made up of: log sequence number, which is a unique ID for a log record a Prev LSN, which is a link to the last log record; Transaction ID number, which is a reference to the database transaction generating the log record; Type, which describes the type of database log record, and information about the actual changes that triggered the log record to be written. In one embodiment, if after a start of transactions, the database is found in an inconsistent state or has not been shut down properly, the database management system reviews the database logs for uncommitted transactions and rolls back the changes made by these transactions. Additionally, all transactions that are already committed but whose changes were not yet materialized in the database are re-applied. Both are done to ensure atomicity and durability of transactions.

In one embodiment, in block 545, log records for the data values inserted into the row identifier range are written. It should be noted, in another embodiment, block 545 may be incorporated in block 540. In one example embodiment, the log records are used if the operation fails and these changes need to be undone. The log records are also useful for a physical redo. In one embodiment, in block 550, the values of the log records are copied onto data blocks. In systems that store a log identifier on each page (e.g., the page LSNs used in write-ahead-logging protocols, such as ARIES), in block 550 the page LSN is updated to the log record of the batch start. In block 555 a log record for the end of the batch is written, optionally, if the recovery process looks for this to determine that the entire batch was processed successfully. Upon recovery from a crash, if write locks are held thru commit, the batch-start log identifier is used to decide which log record batches to replay; otherwise, the batch end log identifier is used. In one embodiment, the process 500 may optionally update the page LSN with the batch-end LSN in block 560 (only needed if write locks are not held thru commit). In one embodiment, in block 565, any indexes are updated if needed. This involves sorting the values if these are tree indexes such as B+ Trees. In one embodiment, the process can afford to perform coarse grained latching if any structure modifying operations, such as page splits, are needed.

Figure 6:
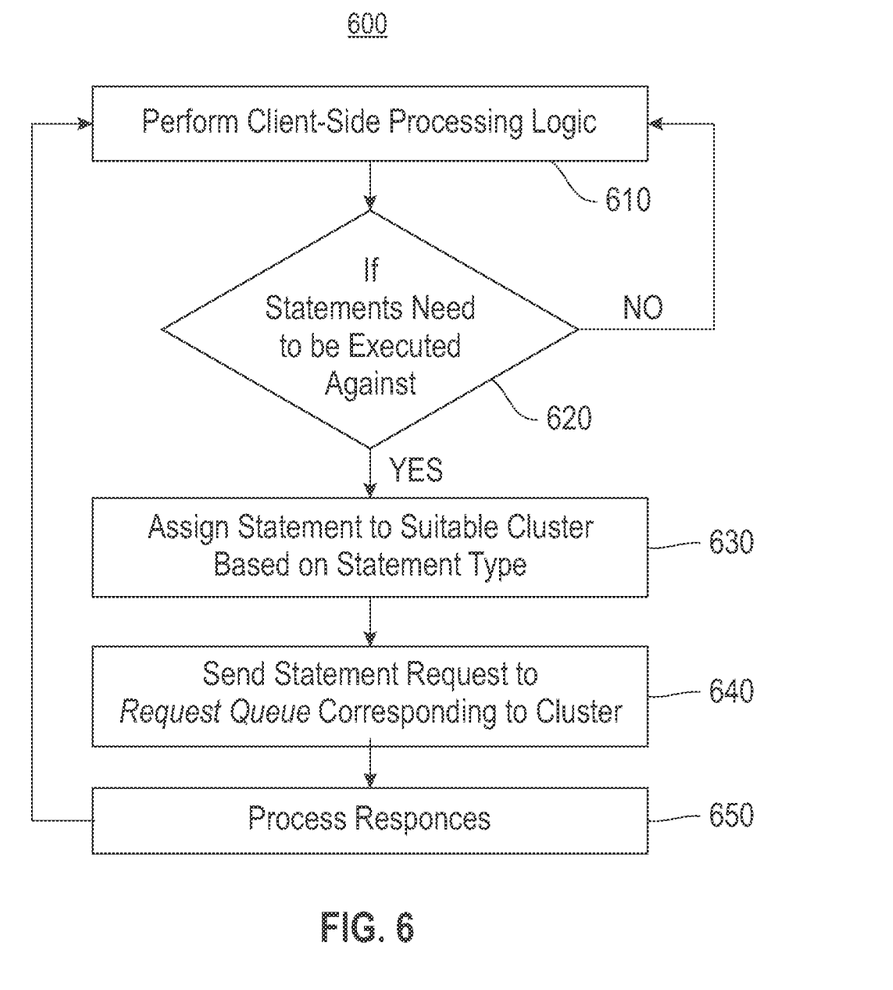
FIG. 6 illustrates a block diagram for a client for processing transactions and assigning requests within those transactions to clusters, according to an embodiment.

FIG. 6 illustrates a block diagram 600 for a client for processing transactions and assigning requests within those transactions to clusters, according to an embodiment. In one embodiment, in block 610 client-side processing is performed (e.g., by the client processor 420, FIG. 4). In one embodiment, in block 620 it is determined if statements need to be executed against database. If it is determined that statements do need to be executed against the database, then processing continues to block 630, otherwise processing proceeds back to block 610.

In one embodiment, in block 630 a statement is assigned to a suitable cluster based on the statement type (e.g., by the client processor 420). In block 640, the statement request is sent to the request queue corresponding to the assigned cluster. In block 650, responses are processed.

Figure 7:
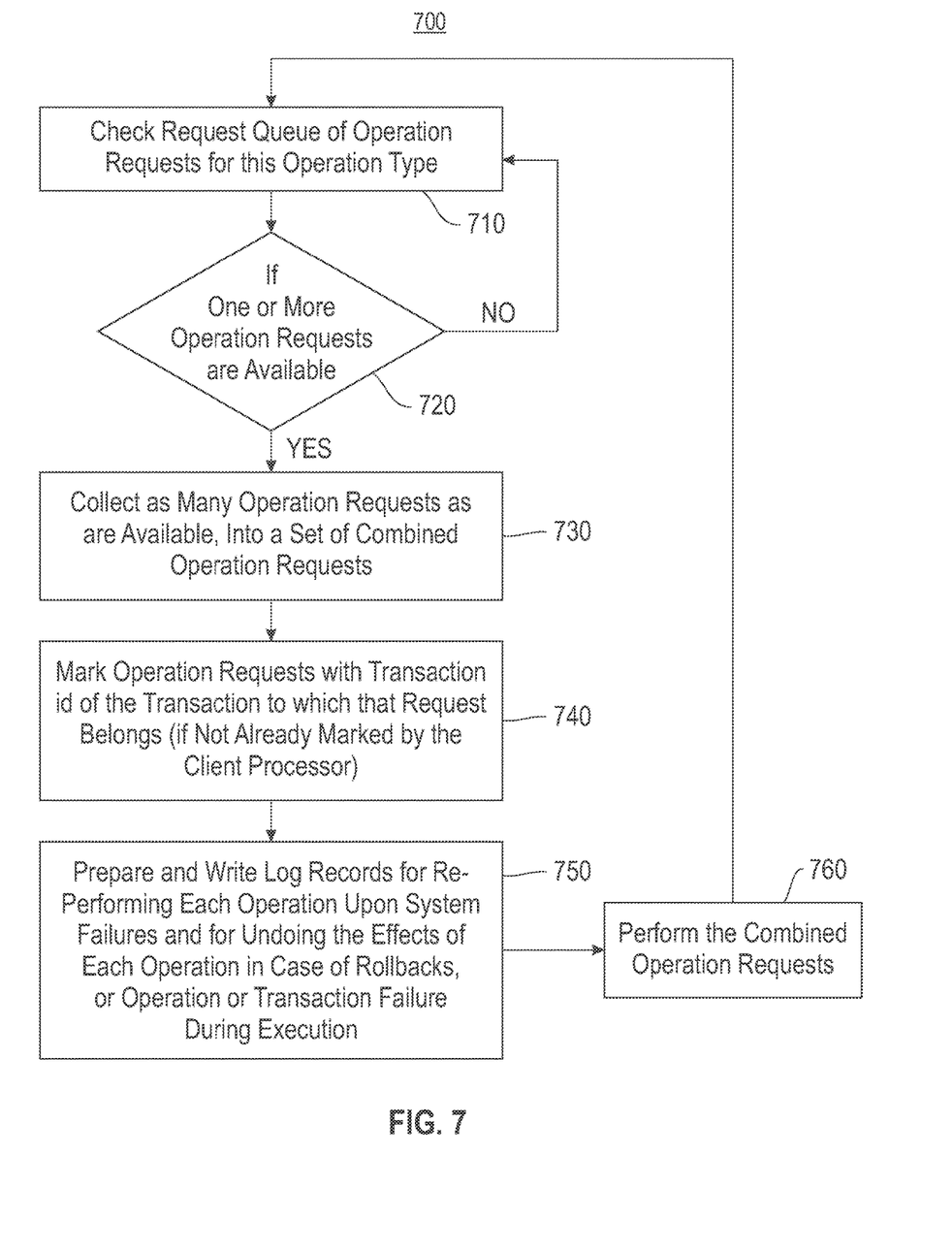
FIG. 7 illustrates a block diagram for a database server process for receiving and performing batches of requests and sending responses, according to an embodiment.

FIG. 7 illustrates a block diagram 700 for a database server process for receiving and performing batches of requests and sending responses, according to an embodiment. In block 710, the request queue is checked for operation requests for a specific type of operation. In block 720, it is determined if one or more operation requests are available. If it is determined that one or more operation requests are available, then processing continues to block 730, otherwise processing continues to block 710.

In one embodiment, in block 730 as many operation requests as are available are collected into a set of combined operation requests. In block 740, operation requests are marked with a transaction id of the transaction to which that request belongs (if not already marked by the client processor (e.g., client processor 420, FIG. 4). In block 750 log records are prepared and written for re-performing each operation upon system failures and for undoing the effects of each operation in case of rollbacks, or operation or transaction failure during execution. In block 760, the combined operation requests are performed (e.g., by the batched requests processor 425, FIG. 4).

Figure 8:
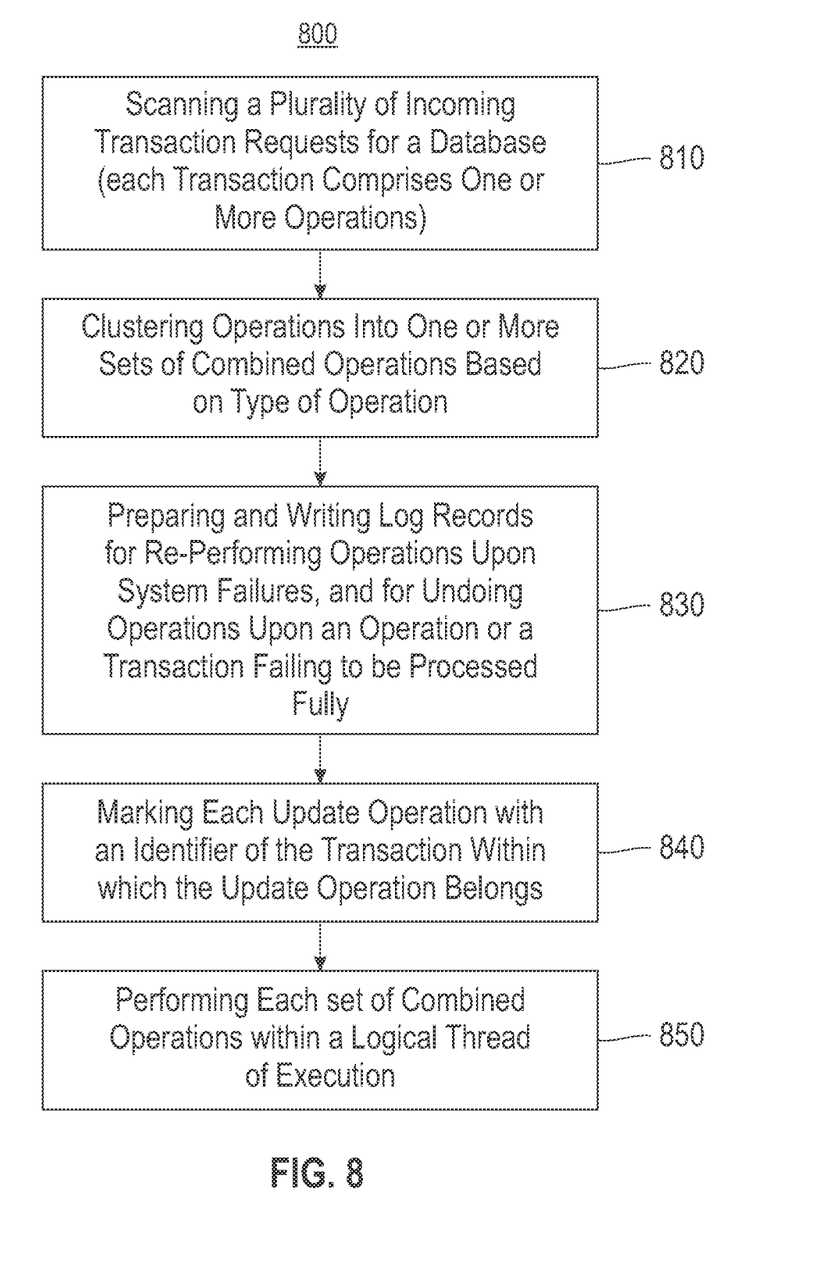
FIG. 8 is a block diagram of a process for pooling work across multiple transactions as a batch based on clustering request types, according to an embodiment.

FIG. 8 is a block diagram of a process 800 for pooling work across multiple transactions as a batch based on clustering request types, according to an embodiment. In one embodiment, in block 810 a plurality of incoming transaction requests for a database are scanned (each transaction comprises one or more operations). In one embodiment, in block 820 operations are clustered into a set of combined operations based on type of operation constraints (e.g., updates/queries, and constraints such as same operating page, etc.). In one embodiment, in block 830 log records for re-performing operations upon system failures, and for undoing operations upon an operation or transaction failing to be processed fully are prepared and written. In one embodiment, in block 840 each update operation is marked with an identifier of the transaction within which the update operation belongs. In block 850, each set of combined operations within a logical thread of execution is performed.

In one embodiment, process 800 may include clustering operations based on database pages that the operations operate on, where multiple operations operate on a single database page under a consolidated latch. In one embodiment, process 600 may further include: for each database page that operations operate on, recording a value of a monotonically increasing counter, and incrementing the counter when the log records are written. In one embodiment, the counter value recorded on a particular database page indicates a subset of operations that have been operated on the particular database page. In one embodiment, transactions arise from separate nodes on a file system cluster.

In one embodiment, an operation comprises at least one of an insert, a delete, or a data value modification. In one embodiment, for an insert operation, process 800 may include combining operations that are inserting rows of data into a same database table, and for a delete operation, operations are combined that are deleting data from a same database table.

In one embodiment, database queries use the marked update operation for a transaction for determining whether to ignore an operation effect or not. In one embodiment, in process 800, the logical thread comprises an execution thread or process on at least one of a single node or virtual machine (VM). In another embodiment, in process 800, the logical thread comprises an execution thread spread across multiple nodes or VM guests. It should be noted that a virtual machine guest (VMg) is the software component of a VM, an independent instance of an operating system (e.g., a guest operating system) and its associated software and information. In one embodiment, operations are combined that are executing a common prepared statement.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    scanning a plurality of incoming transaction requests for a database, wherein each transaction comprises at least one operation;
    clustering operations into at least one set of combined operations based on type of operation and database pages that the operations operate on;
    preparing and writing log records for re-performing operations upon system failures, and for undoing operations upon an operation failing to be processed fully;
    marking each update operation with an identifier of the transaction within which the update operation belongs; and
    performing each set of combined operations within a logical thread of execution.

2. The method of claim 1, wherein multiple operations operate on a single database page under a consolidated latch.

3. The method of claim 2, further comprising:
    for each database page that operations operate on, recording a value of a monotonically increasing counter; and
    incrementing the counter when the log records are written, wherein the counter value recorded on a particular database page indicates a subset of operations that have been operated on the particular database page.

4. The method of claim 1, wherein transactions arise from separate nodes on a cluster of nodes.

5. The method of claim 4, wherein the logical thread comprises an execution thread spread across multiple nodes or VM guests.

6. The method of claim 1, wherein:
    an operation comprises at least one of an insert, a delete, or a data value modification;

for an insert operation, operations are combined that are inserting rows of data into a same database table; and for a delete operation, operations are combined that are deleting data from a same database table.

7. The method of claim 1, wherein database queries use the transaction identifier marked in the update operation for determining whether to ignore an operation effect or not.

8. The method of claim 1, wherein the logical thread comprises an execution thread or process on at least one of a single node or virtual machine (VM).

9. The method of claim 1, wherein operations are combined that are executing a common prepared statement.

10. A computer program product for pooling work across multiple transactions, the computer program product comprising a computer readable storage device having program code embodied therewith, the program code executable by a processor to:

scan a plurality of incoming database transaction requests, wherein each transaction comprises at least one operation;

cluster operations into a set of combined operations based on type of operation constraints and database pages the operations operate on;

prepare and write log records for re-performing operations upon system failures, and for undoing operations upon an operation failing to be processed fully;

perform each set of combined operations within a thread;

mark each update operation for a transaction within which the update operation belongs; and perform recoverable update operations belonging to a plurality of transactions within a single logical thread of execution.

11. The computer program product of claim 10, wherein multiple operations operate on a single database page under a consolidated latch.

12. The computer program product of claim 11, further comprising:

for each database page that operations operate on, recording a value of a monotonically increasing counter; and incrementing the counter when the log records are written, wherein the counter value recorded on a particular database page indicates a subset of operations that have been operated on the particular database page.

13. The computer program product of claim 10, wherein transactions arise from separate nodes on a file system cluster.

14. The computer program product of claim 10, wherein:

an operation comprises at least one of an insert, a delete, or a data value modification;

for an insert operation, operations are combined that are inserting rows of data into a same database table;

for a delete operation, operations are combined that are deleting data from a same database table; and database queries use the marked update operation for a transaction for determining whether to ignore an operation effect or not.

15. The computer program product of claim 14, wherein the logical thread comprises an execution thread or process on at least one of a single node or virtual machine (VM) and the logical thread comprises an execution thread spread across multiple nodes or VM guests.

16. A system comprising:

a storage device configured to store one or more databases;

a processor configured to:

scan a plurality of incoming transaction requests for a database, wherein each transaction comprises at least one operation;

cluster operations into a set of combined operations based on type of operation constraints and database pages that the operations operate on, and prepares and writes log records for re-performing operations upon system failures, and for undoing operations upon an operation failing to be processed fully; and marks each update operation for a transaction within which the update operation belongs;

a batched requests processor that performs each set of combined operations within a thread; and a logger and roll-back processor that performs recoverable update operations belonging to a plurality of transactions within a logical thread of execution.

17. The system of claim 16, wherein:

multiple operations operate on a single database page under a consolidated latch;

for each database page that operations operate on, the processor records a value of a monotonically increasing counter, and increments the counter when the log records are written; and the counter value recorded on a particular database page indicates a subset of operations that have been operated on the particular database page.

18. The system of claim 16, wherein:

transactions arise from separate nodes on a file system cluster;

an operation comprises at least one of an insert, a delete, or a data value modification;

for an insert operation, the cluster processor combines operations that are inserting rows of data into a same database table; and for a delete operation, the cluster processor combines operations that are deleting data from a same database table, wherein database queries use the marked update operation for a transaction for determining whether to ignore an operation effect or not.

19. The system of claim 18, wherein the logical thread comprises an execution thread or process on at least one of a single node or virtual machine (VM).

20. The system of claim 18, wherein the logical thread comprises an execution thread spread across multiple nodes or VM guests.

* * * * *